L. B. GAYLOR.
TIRE GRIP.
APPLICATION FILED MAR. 3, 1911.

1,001,633.

Patented Aug. 29, 1911.

2 SHEETS—SHEET 1.

Witnesses:
Max B. A. Doring
J. M. Donsbach

Inventor
Leonard B. Gaylor
By his Attorneys
Phillips Abbott

L. B. GAYLOR.
TIRE GRIP.
APPLICATION FILED MAR. 3, 1911.
1,001,633.
Patented Aug. 29, 1911.
2 SHEETS—SHEET 2.
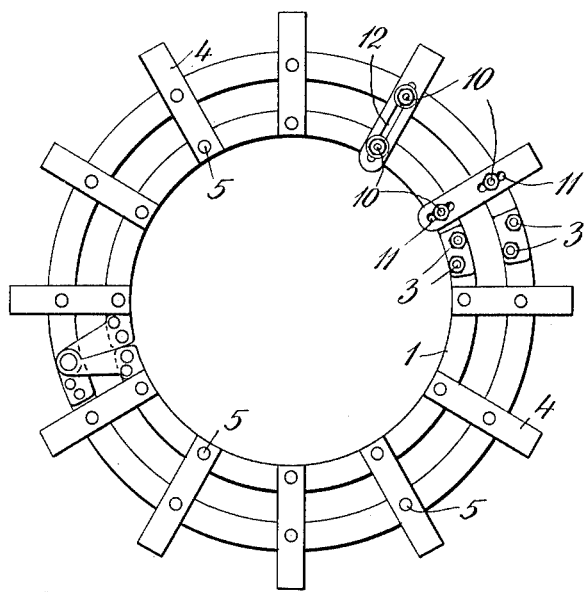
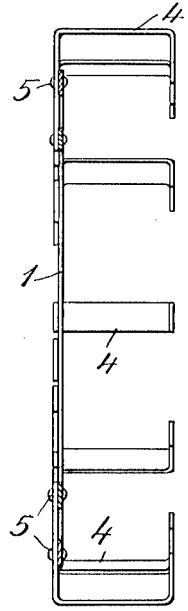
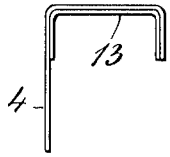
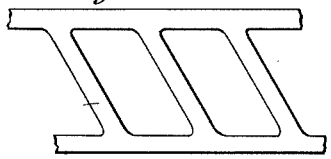
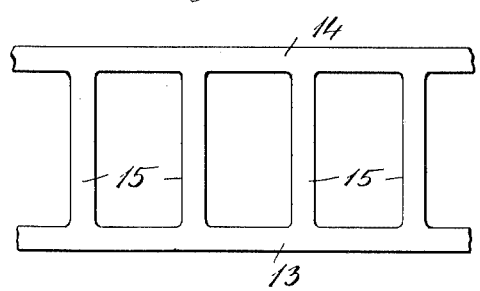
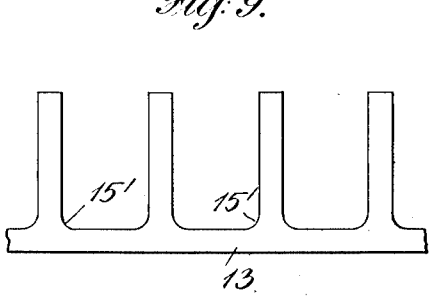

UNITED STATES PATENT OFFICE.

LEONARD B. GAYLOR, OF STAMFORD, CONNECTICUT.

TIRE-GRIP.

1,001,633.  Specification of Letters Patent.   Patented Aug. 29, 1911.

Application filed March 3, 1911. Serial No. 611,976.

*To all whom it may concern:*

Be it known that I, LEONARD B. GAYLOR, a citizen of the United States, and a resident of the city of Stamford, county of Fairfield, State of Connecticut, have invented a new and useful Tire-Grip, of which the following is a specification.

My invention, generally stated, consists in a metallic ring, preferably made in two parts, for convenient application to the wheels, which parts may be hinged, or otherwise connected together and held in position. The ring is provided with radially projecting grip irons, so called, which are likewise made of metal and bent to inclose the periphery of the tire, so that when in use they come successively between the tire and the roadbed, thus serving to prevent slipping or skidding of the wheels.

Figure 1:
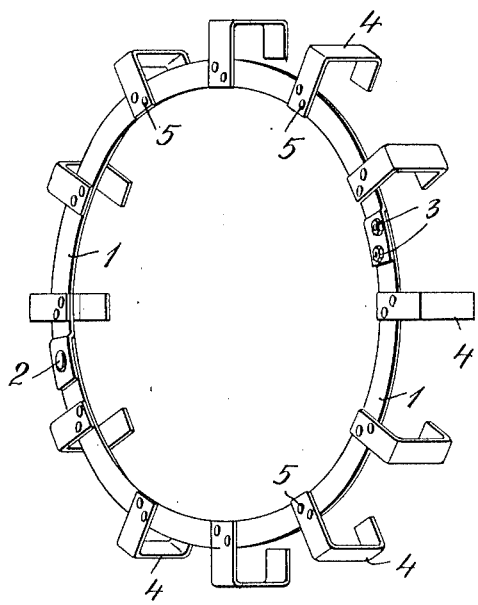
Figure 2:
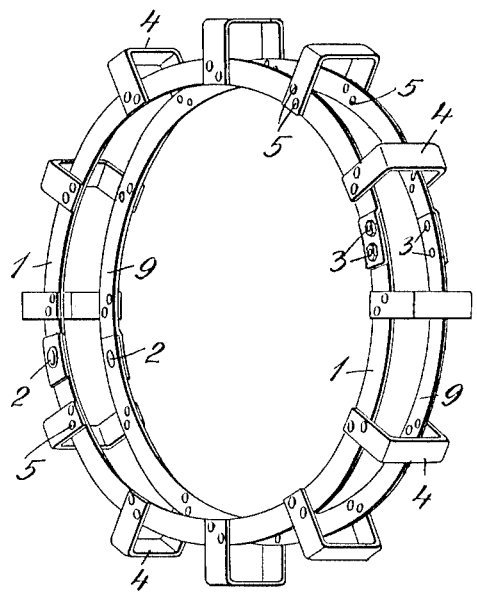
Figure 3:
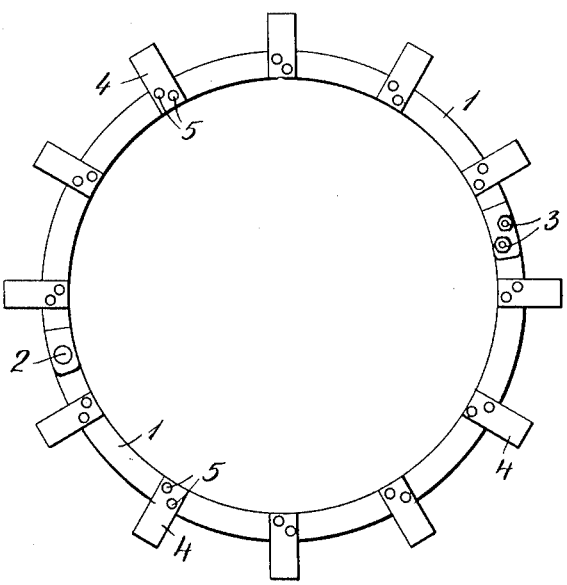
Figure 4:
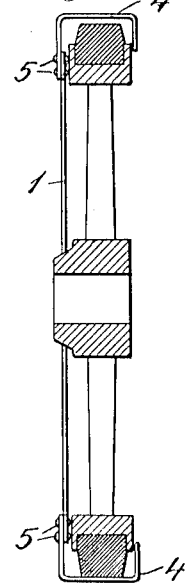

Referring now to the drawings, Figure 1 illustrates a perspective view of one form of the invention, in which one supporting ring only is used; Fig. 2 illustrates a perspective view of the invention adapted to heavy work, in which two rings are employed, one on each side of the wheel, so that both ends of the grip irons are supported; Fig. 3 illustrates an elevation of the form of the invention shown in Fig. 1; Fig. 4 illustrates the form of the invention shown in Figs. 1 and 3 as applied to a wheel having a solid tire; Fig. 5 illustrates a modified construction in which two supporting rings are employed, both upon the same side of the wheel, showing also devices whereby the grip irons may be adjusted radially; Fig. 6 illustrates a form of the invention adapted to heavy work, in which duplex tires are employed on the driving wheels; Fig. 7 illustrates a construction in which a tire preserving lining is applied to the grip irons; Fig. 8 illustrates a method in which the structure may be conveniently made from a single piece of metal, in which construction two rings, one on each side of the wheel, with connecting grip irons, will be produced; Fig. 9 illustrates a method in which the structure may be conveniently made from a single piece of metal, similar to Fig. 8, but having one supporting ring only; Fig. 10 illustrates sectional views of different forms in which the grip irons may be made; Fig. 11 illustrates a construction in which the grip irons cross the face of the tread of the tire diagonally.

Various anti-skidding devices have heretofore been devised, several of which are effective for relatively light machines subjected to relatively light work, such as the ordinary passenger automobile, but difficulty has been experienced in constructing an anti-slipping or anti-skidding device for heavy work, trucks and the like, many of which in these days are designed to carry very heavy loads and in use necessarily to surmount heavy grades. My invention is intended more especially to supply this last-mentioned want, although adapted for use on lighter vehicles and for lighter work.

Referring now to the drawings, I illustrate in them various forms in which the invention may be embodied. Some of them are better adapted to certain uses than others but the same invention is present in them all.

1 (see Figs. 1, 3 and 4) represents a rigid ring of metal, preferably steel. I usually make it about a quarter or half an inch thick and from an inch to two inches wide. It is preferably made in two sections which are hinged together at 2 and provided with bolts 3, 3, at their meeting ends, whereby the sections of the ring may be firmly bolted together when in position.

4, 4, are a series of grip irons which are bolted to the ring by bolts 5, and are bent so as to inclose the tire, as illustrated in Fig. 4. The free ends of the respective grip irons are made sufficiently long, as shown, to engage with the side of the rim of the wheel.

The grip device is made of such size as to properly conform to the wheel with which it is to coöperate, and, as shown in Fig. 4, it need not be and preferably is not rigidly fastened to the wheel, on the contrary, a little play is permitted, so that the pressure upon the grip irons at the lower side of the wheel will cause the structure to shift slightly across the wheel, leaving a slight space between the tire and the grip irons at the upper arc of the wheel. Also the structure is preferably made sufficiently loose to permit of a creeping action relative to the tire circumferentially of the wheel when in use, so that the grip irons will not make contact with the tire at predetermined places only, but on the contrary, the places of contact between the grip irons and the tire will be continually changed.

The grip irons are preferably made of substantially the same thickness of metal as that composing the ring, that it so say, from about a quarter to half ån inch in thickness and an inch to two inches in width, and as shown at 6 in Fig. 10, they may be made flat, or as shown at 7 in Fig. 10, concavo-convex, the convex surface coming next to the tire, or they may be rounded at their under side, so as not to wear the tire, and have an outwardly extending rib or a series of points adapted to better engage with ice and snow, as shown at 8 in Fig. 10.

The grip irons, as above stated, may be bolted to the supporting rings, or may be welded or riveted thereto, or, as hereinafter described, the entire structure may be cut from a single piece of sheet metal, so that the ring or rings and the grip irons shall all constitute an integral structure.

In Fig. 2, I show a form in which two rings are employed. One designated by the numeral 1, as heretofore, will be upon one side of the wheel. The other designated by the numeral 9, will be upon the other side of the wheel. Both rings are of course provided with the hinges 2, 2, and with securing bolts 3, 3. This form I particularly desire for heavy work, so that the grip irons may be supported upon both sides of the wheel, thus avoiding their possible distortion.

In Fig. 5, I show a construction in which there are two concentric supporting rings shown upon the same side of the wheel. There may of course be two similar rings upon the other side if desired. In this construction the grip irons may be bolted, welded, or otherwise secured to both rings, and both rings of course must be provided with an adequate hinged joint as indicated, or preferably the two halves of the structure will be bolted together without using any hinged joint whatever, so as to secure greater strength and rigidity at this joint. In this Fig. 5 I show also means whereby the grip irons may be adjusted radially, that is to say, at 10, 10, I show two bolts which are adapted to pass through a series of holes 11, 11, bored in the grip irons and pass through appropriate holes (not shown) in the rings, so that the grip irons may be adjusted radially, depending upon the particular holes in them through which the bolts pass. I likewise show in an adjoining grip iron a continuous slot 12 through which the bolts 10, 10 pass, whereby any degree of adjustment may be secured.

In Fig. 7 I show at 13 what I call a lining for the grip irons. It may be made of rubber, leather, fiber, or such other substances as desired, to act as a protection for the tire, if found necessary. It may be fastened to the grip irons in any preferred manner and by any preferred means.

In Figs. 8 and 9 I show a method in which the rings and the grip irons may be cut by any suitable apparatus from hot or cold sheet steel, and afterward bent or rolled into the completed structure, so that two laterally extending parts 13 and 14 will constitute the two rings, one on each side of the wheel, and the transverse parts 15, 15, will constitute the grip irons. In Fig. 9 I show substantially the same thing as shown in Fig. 8, excepting that one ring which I designate 13 and which will be on one side of the wheel only, will be produced, and in which construction also show at 15', 15', that during the forming operation the point of junction between the transverse grip irons and the ring strip 13 may be made additionally strong by leaving an added amount of the metal in the corners where these two parts join. In both of the constructions shown in Figs. 8 and 9, the structures will of course have to be made in at least two parts, so that they may be applied to the wheels, suitable bolts, or other means being provided whereby the sections may be fastened rigidly together.

In Fig. 11 I show a method similar to Fig. 8, in which however when the metal is rolled or bent into shape, the grip irons will extend diagonally across the face of the tread of the tire, instead of at right angles thereto, thus tending to prevent skidding upon turning corners, etc. This disposition of the grip irons may, of course, be embodied in the form of the structure in which the grip irons are bolted or riveted or welded to the rings.

To apply the grip structure to the wheel, the wheel is jacked up, the bolts 3, 3, uniting the free ends of the two halves of the rings are removed and the grip is opened after the manner of a hinged bracelet, the two parts swinging on the pivot of the hinge 2. The device is then applied to the wheel, the free ends are brought together again and the bolts 3, 3, replaced. If bolts are used at both sides of the ring instead of a hinge at one side, then of course all bolts are removed, the two halves are properly adjusted upon the wheel, the bolts replaced and screwed up.

The thickness and width of the metal, the special form of the device, i. e., whether with one ring only, or with one ring on each side of the wheel, or with two rings on one side only, or two rings on each side, and whether the grip irons be made adjustable or not and whether they extend at right angles or diagonally across the tire or not, and the degree of tightness of the fit between the periphery of the tire and the device, will all be determined by the special use and the special vehicle upon which the grips are applied. Also the cross-section of the grip irons, whether flat, concavo-convex, or ribbed, will likewise be a matter of individual preference, in view of the particular vehicle and the special use to which it is put. It is not essential that the rings be made in two parts provided with hinge or bolt connections, although I greatly prefer that construction, because obviously the rings may be made continuous or unbroken and the structure applied to the wheel by temporarily removing some of the grip irons. This would, however, only be feasible where the grip irons were bolted to the ring and such manipulation would also be difficult, particularly if two or more rings, one on each side of the wheel, where employed.

I call particular attention to the fact that my grip differs essentially from most of those now in use, particularly on pneumatic tires, in that my grip is rigid throughout and is not flexible in any part, except that the grip irons, especially if made as shown in Figs. 1, 4 and 6, will in use spring somewhat under the pressure exerted on them, but this slight flexure is merely incidental and is not relied upon for any advantageous result.

I claim:

1. In a tire grip continuous rigid annular means for the support of the grip irons, and grip irons made of metal having greater width than thickness rigidly connected to said supporting means and bent flatwise to inclose the periphery of the tire.

2. In a tire grip continuous rigid annular means for the support of the grip irons made in sections, grip irons made of metal having greater width than thickness bent flatwise to inclose the periphery of the tire and rigidly connected to said sections, and means for connecting the sections rigidly together.

3. In a tire grip continuous rigid annular means for the support of the grip irons, grip irons made of metal having greater width than thickness bent flatwise to inclose the periphery of the tire and rigidly connected to said supporting means, the grip irons being of such length that their ends shall lap over the rim of the wheel.

In testimony whereof I have signed my name to this specification in the presence of two subscribing witnesses.

LEONARD B. GAYLOR.

Witnesses:
PHILLIPS ABBOTT,
CORNELIUS P. McLAUGHLIN.